United States Patent
Tiptur Nataraj et al.

(10) Patent No.: US 10,460,244 B2
(45) Date of Patent: Oct. 29, 2019

(54) AUTOMATIC RESPONSE SYSTEM FOR WEARABLES

(71) Applicant: Intel Corporation, Santa Clara, CA (US)

(72) Inventors: Sunil Tiptur Nataraj, Santa Clara, CA (US); Fai Yeung, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 14/976,843

(22) Filed: Dec. 21, 2015

(65) Prior Publication Data

US 2017/0178004 A1    Jun. 22, 2017

(51) Int. Cl.
  *G06N 5/02*    (2006.01)
  *G06F 1/16*    (2006.01)
  *G06F 3/0484*  (2013.01)
  *G06F 16/335*  (2019.01)

(52) U.S. Cl.
  CPC .............. *G06N 5/022* (2013.01); *G06F 1/163* (2013.01); *G06F 3/04842* (2013.01); *G06F 16/335* (2019.01); *G06N 5/02* (2013.01)

(58) Field of Classification Search
  None
  See application file for complete search history.

(56) References Cited

U.S. PATENT DOCUMENTS

| 8,655,321 B2 | 2/2014 | Baer et al. |
| 8,661,112 B2 | 2/2014 | Creamer et al. |
| 8,996,639 B1 * | 3/2015 | Faaborg ............ H04L 51/02 455/412.1 |

FOREIGN PATENT DOCUMENTS

EP    1953723 B1    3/2012

OTHER PUBLICATIONS

Geambasu, et al., HomeViews: Peer-to-Peer Middleware for Personal Data Sharing Applications, SIGMOD'07, Proceedings of the 2007 ACM SIGMOD international conference on Management of data, Jun. 12-14, 2007, pp. 235-246.*

* cited by examiner

*Primary Examiner* — Wilbert L Starks
(74) *Attorney, Agent, or Firm* — Grossman, Tucker, Perreault & Pfleger, PLLC (57) ABSTRACT

One embodiment provides an apparatus. The apparatus includes a wearable device. The wearable device includes a knowledge base, a user interface and automatic response logic. The knowledge base includes at least one data structure. Each data structure includes a plurality of ranked possible user responses. The automatic response logic is to select one data structure of the at least one data structure in response to a received communication. The selecting is based, at least in part, on an event type and based, at least in part, on a contact identifier. The communication is received from a communication partner device via a companion device. The automatic response logic is further to provide at least one ranked possible user response from the selected data structure to a user via the user interface.

20 Claims, 4 Drawing Sheets

AUTOMATIC RESPONSE SYSTEM FOR WEARABLES

FIELD

The present disclosure relates to an automatic response system, in particular to, an automatic response system for wearables.

BACKGROUND

Wearable devices such as smart watches and/or activity trackers have relatively small displays or may not have a display. The displays (if any) may be touch sensitive and/or the wearable device may include, for example, an accelerometer configured to detect taps. In some situations, the wearable device may be coupled to another user device, such as a smart phone. In these situations, the wearable device may be configured to receive communication from a remote communication device via the smart phone. Utilizing the relatively small display to generate a detailed response to the received communication can be difficult.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to an automatic response system for wearables. An apparatus, method and/or system are configured to provide a user with ranked possible user response(s) on a wearable device in response to a communication received by the wearable device via a companion device from a communication partner device. The user may then select one of the ranked possible user response(s) using the wearable device or may choose to respond manually using either the wearable device or the companion device. Providing ranked possible user response(s) is configured to facilitate selection, by the user, of a desired user response while avoiding entering (e.g., typing) the entire user response content on the wearable device.

The apparatus, method and/or system includes a knowledge base comprising a plurality of data structures. Each data structure may correspond to an event type and a contact identifier. Event type may include, but is not limited to, a telephone call, an email, a text message, a calendar message, e.g., a meeting request, and/or a social media communication. Contact identifiers may include, but are not limited to, contact name, contact group name, "unknown" and "default". The contact identifier may be determined based, at least in part, on a communication source identifier. Communication source identifiers may include, but are not limited to, telephone numbers, email addresses, texting numbers, social media usernames, social media addresses, etc. A group corresponds to a group of contact names. The group may be identified by a group name. Unknown corresponds to a communication source identifier that is not included in a contact list. Default corresponds to a communication source identifier where an associated contact name and event type pair is not associated with a data structure, as described herein. The knowledge base may be constructed based, at least in part, on a history of communications from/to the wearable device and/or companion device.

Each data structure is configured to store ranked possible user responses related to the event type and the contact identifier. The ranked possible user responses may be ranked according to a frequency of use. Frequency of use is related to a number of times a possible user response has been chosen by the user. For example, frequency of use may correspond to a count of the number of times an associated possible user response was selected by the user. The knowledge base data structures are configured to facilitate retrieving ranked possible user responses. For example, the knowledge base may include one or more priority queues. Each priority queue is configured to include a plurality of possible user responses. In another example, the knowledge base may include a plurality of arrays with each array configured to store a plurality of possible user responses and associated count. In another example, the knowledge base may include a plurality of linked lists with elements in each linked list ordered according to frequency of use of the associated possible user response.

The knowledge base may be accessed in response to receiving a communication. The communication may be received from the communication partner device by the companion device and provided to the wearable device by the companion device. The received communication may be analyzed by, e.g., automatic response logic. In an embodiment, the automatic response logic may be resident on the wearable device. In another embodiment, the automatic response logic may be resident on the companion device. The automatic response logic may utilize the knowledge base to select one or more possible user responses for provision to the user. For example, an event type may be determined, a communication source identified and a contact identifier determined. A data structure in the knowledge base that corresponds to the determined event type and determined contact identifier may be selected, i.e., identified, and accessed. One or more possible user response(s) may then be retrieved from the selected data structure and provided to the user, in rank order. In other words, a most frequently selected possible use response (i.e., highest rank) may be provided first and a least frequently selected possible use response (i.e., lowest rank) may be provided last.

The user may then choose a desired response from the provided possible user responses or may choose to respond manually. The knowledge base may be updated based, at least in part, on the user choice. For example, if the user chooses a provided possible response, a count associated with the chosen user response may be incremented and the rank associated with the chosen response may be increased. In another example, if the user chooses to respond manually, one or more count(s) associated with the provided possible response(s) may be decremented and the manual response content may be captured and added to an appropriate priority queue. The user chosen response may then be transmitted by the companion device, as described herein.

Thus, the knowledge base is configured to store a plurality of data structures that each includes a plurality of ranked possible user responses, learned, based, at least in part, on a history of user communication utilizing the wearable device and/or the companion device. The possible user responses may be related to the contact identifier, a communication (i.e., event) type and/or to communication content. Thus, the user responses may be relatively more personalized compared to a static list of possible user responses while entering the content of the user response into the wearable device may be avoided.

Figure 1:
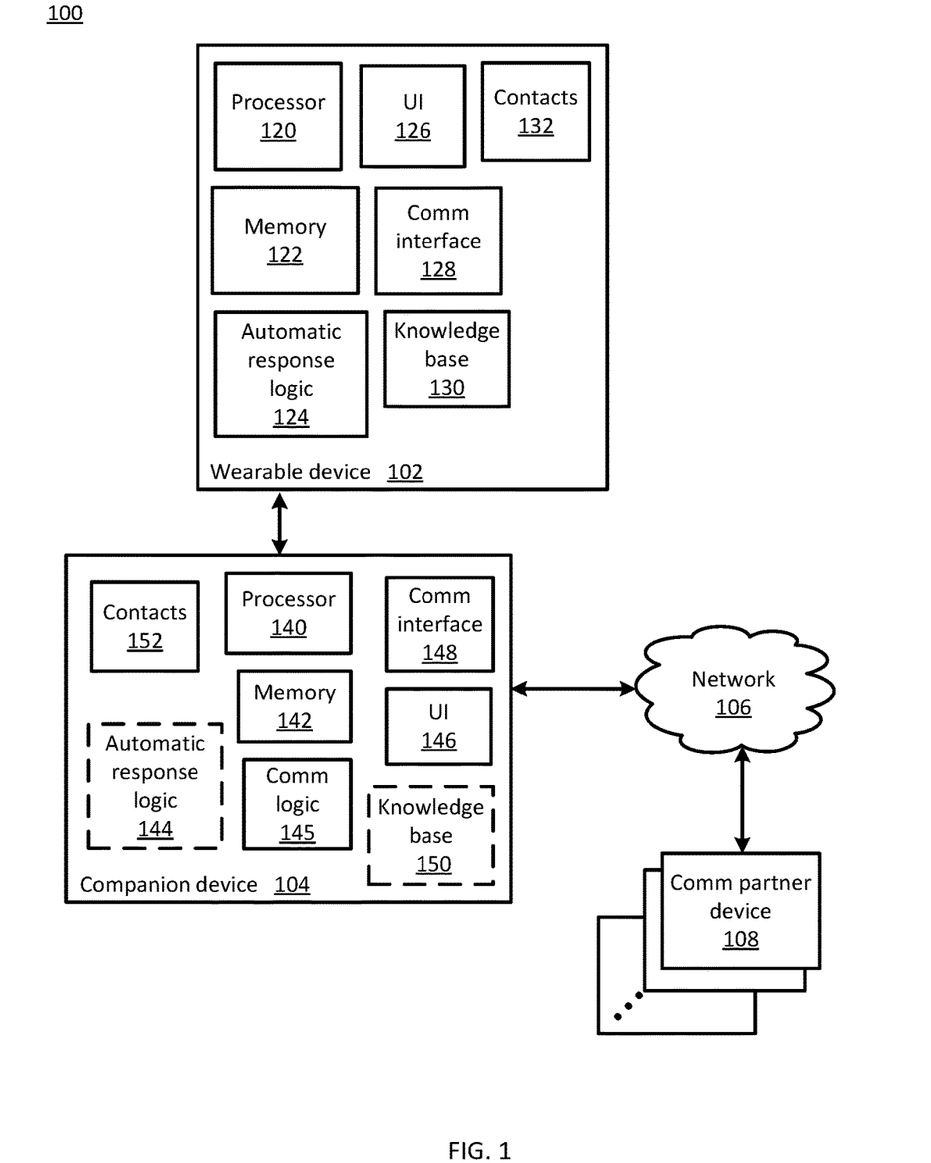
FIG. 1 illustrates a functional block diagram of an automatic response system for wearables consistent with several embodiments of the present disclosure.

FIG. 1 illustrates a functional block diagram of an automatic response system 100 for wearables consistent with several embodiments of the present disclosure. The system 100 includes a wearable device 102 and a companion device 104 and may include a network 106 and one or more communication partner device(s), e.g., communication partner device 108.

Wearable device 102 may include, but is not limited to, a wearable computer, a "smart" watch, a smart bracelet, a smart wristband, smart glasses, smart clothing, an activity tracker, a fitness tracker, etc. Wearable device 102 may include a touch sensitive display configured to detect user gestures and/or typing and/or may include an accelerometer configured to detect user taps. The touch sensitive display, if present, may be relatively small to fit a form factor of the wearable device. Companion device 104 may include, but is not limited to, a mobile telephone including, but not limited to a smart phone (e.g., iPhone®, Android®-based phone, Blackberry®, Symbian®-based phone, Palm®-based phone, etc.); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer; etc.

Communication partner device 108 may include, but is not limited to, a wearable computer, a "smart" watch, a smart bracelet, a smart wristband, smart glasses, smart clothing, an activity tracker, a fitness tracker, etc.; a mobile telephone including, but not limited to a smart phone (e.g., iPhone®, Android®-based phone, Blackberry®, Symbian®-based phone, Palm®-based phone, etc.); a computing system (e.g., a server, a workstation computer, a desktop computer, a laptop computer, a tablet computer (e.g., iPad®, GalaxyTab® and the like), an ultraportable computer, an ultramobile computer, a netbook computer and/or a subnotebook computer, etc. Communication partner device 108 may be used by a communication partner, i.e., another user, to transmit communications to, and/or receive communications from, companion device 104. The communication partner device and/or communication partner may be identified by a communication source identifier, e.g., a telephone number, an email address, etc. For example, the communication source identifier may be related to a contact name included in a contact list, as described herein. In another example, the communication partner may be unknown. In other words, the communication source identifier may not be included in the contact list.

Companion device 104 is configured to provide remote communication capability to the wearable device 102. The wearable device 102 may be configured to communicate with communication partner device 108 via companion device 104. The companion device 104 may be coupled to the communication partner device 108 via the network 106. For example, the network 106 may include a cellular telephone network, a local area network (LAN), a wide area network (WAN), an Ethernet network and/or the Internet. Companion device 104 and communication partner device 108 may be configured to communicate voice and/or data. Data may include email, text message, social media content and/or calendar-related content, e.g., meeting requests.

Wearable device 102 includes a processor 120, memory 122, a user interface (UI) 126 and a communication interface 128. In an embodiment, wearable device 102 may include automatic response logic 124, a knowledge base 130 and/or contacts 132. Companion device 104 may include a processor 140, memory 142, communication logic 145, a user interface (UI) 146, a communication interface 148 and contacts 152. In an embodiment, companion device 104 may include automatic response logic 144 and a knowledge base 150.

Processors 120, 140 are configured to perform operations of wearable device 102 and companion device 104, respectively. UI 126, 146 are configured to capture user inputs and to output information to the user. For example, UI 126, 146 may include a touch sensitive display configured to detect user gestures (e.g., pinch, swipe, tap, double tap, etc.) and/or an accelerometer configured to detect user tap(s). UI 126, 146 may further include a vibration source configured to vibrate the respective device 102, 104 to notify the user of an event, as described herein. UI 126, 146 may further include a microphone and/or a speaker configured to capture audio input and/or provide audio output, respectively. UI 126 may further include a visual indicator, e.g., a light emitting diode, configured to light to notify the user of an event.

Wearable device 102 and companion device 104 may be configured to communicate using one or more near field communication (NFC) protocols. NFC may include, for example, Bluetooth. Thus, communication interfaces 128, 148 may comply and/or be compatible with one or more NFC protocol(s). Companion device 104 may be further configured to communicate with communication partner device 108 and/or network 106, wired and/or wirelessly, utilizing one or more communication protocols, as described herein. Thus, communication interface 148 may comply and/or be compatible with one or more communication protocol(s).

In operation, companion device 104 is configured to transmit and/or receive communications between wearable device 102 and communication partner device 108. For example, communication logic 145 may manage communication between companion device 104 and wearable device 102. The communication may include telephone calls, electronic mail (i.e., email), text messages, meeting requests and/or social media-related communication. For example, a communication from communication partner device 108 may be received by companion device 104. In response to receiving the communication, companion device 104, e.g., communication logic 145, may notify the user and/or may provide the communication to wearable device 102. As used herein, an event corresponds to receipt of a communication by companion device 104 and/or wearable device 102. Event type may include, but is not limited to, telephone call, email, text message, social media communication and/or calendar communication (e.g., meeting request).

The user may then choose whether to respond manually or utilize the automatic response system. For example, a manual response may be indicated by the user actively answering an incoming telephone call, opening an email and/or text message, etc. In another example, operation of the automatic response system may be initiated if the user does not select manual response within a time interval. If the user chooses to respond manually, automatic response logic 144 is configured to capture details related to the manual response. For example, a communication partner device identifier (i.e., communication source identifier), a communication type (i.e., event type) and/or communication content may be captured. The captured details may then be analyzed and knowledge base 130, 150 may be updated. For example, analyzing the captured details may include natural language processing of the communication content, as described herein. The analysis may further include associating key words from the communication from the communication partner with key words in responses and/or the responses by the user.

Automatic response logic 124, 144 may be configured to monitor communication between companion device 104 and/or wearable device 102 and one or more communication partner devices, e.g., communication partner device 108. Automatic response logic 124, 144 may be further configured to capture and/or determine information related to the monitored communications. For example, the information may include a communication source identifier, a contact name, a group name, a contact identifier, a communication (e.g., event) type, communication content, user response, a count corresponding to a number of times that a specific user response was provided. The information related to the monitored communications may be stored, for example, in a knowledge base, e.g., knowledge base 130, 150.

Knowledge base 130, 150 may be constructed initially based, at least in part, on a plurality of received communications and based, at least in part, on the plurality of associated user responses. Knowledge base 130, 150 may be utilized and updated during operation, as described herein. Knowledge base 130, 150 may include one or more data structures configured to store ranked user possible responses associated with event types and contact identifiers. The user possible responses may be ranked according to a number of times used, i.e., a count. The data structures may include, but are not limited to, arrays, linked lists, priority queues, heaps, etc. Thus, for each event type and contact identifier pair, an associated data structure may be populated (i.e., constructed) that includes a plurality of user possible responses and the plurality of associated counts. The possible user responses may be ordered, i.e. ranked, according to the associated counts. The user possible responses may be represented by user possible response identifiers in the data structure. The data structures are configured to facilitate identifying possible user responses based, at least in part, on event type and based, at least in part, on contact identifier.

Over time, a plurality of communications may be received by companion device 104. The communications may then be provided to wearable device 102 by companion device 104, e.g., communication logic 145. The plurality of communications may include a plurality of event types, a plurality of communication source identifiers, a range of communication content and a range of user responses. Each communication source identifier may be associated with a contact name in contacts 132, 152 or may be unknown. Communication source identifiers that are associated with respective contact names may be further associated with a contact group. In some situations, a user may respond similarly to at least a subset of communications of a same event type from a communication source associated with a same contact name. For example, the user's response to a calendar event, e.g., a meeting request, from the user's supervisor may be "accept" most of the time and "reject" infrequently. In another example, a communication from the user's spouse that includes a request may generally prompt an affirmative user reply. Each possible user response may be annotated (i.e., associated) with a count that corresponds to a number of times that the user provided that response. A relatively higher count may then correspond to a relatively more frequently selected possible user response.

For each received communication, an event type may be determined. Event type may be determined by automatic response logic 124 and/or 144. Event types may include, but are not limited to, receiving a telephone call, receiving an email, receiving a text message, receiving a meeting request and/or receiving a social media communication. A communication source identifier may then be captured. For example, the communication source identifier may be captured by automatic response logic 124, 144. Communication source identifiers may include, but are not limited to, a telephone number, an email address, a texting number and/or a social media address. For example, a texting number may have a format similar to a telephone number. In another example, a social media address may have a format similar to an email address.

A contact identifier may then be determined based, at least in part, on the communication source identifier. Contact identifiers may include contact name, group name, unknown or default. For example, contacts 132, 152, i.e., contact list, may be accessed by automatic response logic 124 and/or 144, utilizing the communication source identifier to determine the associated contact identifier. If contacts includes the communication source identifier then the associated contact name may be identified. If contacts does not include the communication source identifier, then the contact identifier may be deemed unknown. For determined contact names, a contact group that includes the determined contact name may then be identified. Contact groups may include, but are not limited to, family, friends, coworkers and/or one or more customized group(s). Customized groups may include, for example, a special group whose members may generally receive relatively more directed possible responses compared to group possible responses.

Content of the received communication may be captured. For example, if the received communication is an email, an associated subject line and/or body of the email may be captured. Natural language processing may then be applied to the associated subject line and/or body of the email to extract one or more keywords. In another example, if the received communication is a text message, the content of the text message may be captured and natural language processing may be similarly applied the content of the text message to extract one or more keywords.

If the received communication is a telephone call, the user's response may be captured. In this case, possible user responses may include accepting (i.e., answering) the telephone call, rejecting the telephone call without more or rejecting the telephone call and responding via another communication type. For example, the user may choose to send a text message in response to an unanswered telephone call.

If the user responds to the received communication, the type of communication and/or content of the response may be captured. For example, if the response is an email, an associated subject line and/or body of the email may be captured. Natural language processing may then be applied to the associated subject line and/or body of the email to extract one or more keywords. In another example, if the response is a text message, the content of the text message may be captured and natural language processing may be similarly applied the content of the text message to extract one or more keywords. The text message may be constructed based, at least in part, on event type and based, at least in part, on contact identifier included in the knowledge base 150, 130. The constructed text message may then be displayed to the user. The user may approve, i.e., select, the displayed message or may choose to respond manually. Each manual response from the user may then be analyzed and added to knowledge base. Adding user manual responses to the knowledge base 130, 150 is configured to improve accuracy and to increase the likelihood that a relatively higher ranked possible response will be selected by the user. If the user selects the constructed message then a count in the knowledge base 130, 150 associated with the constructed message may be incremented.

The natural language processing technique may be used to analyze various factors including, but not limited to, sentiment, objective and context of the response. Natural language processing may facilitate identifying responses that contain similar phrases. Natural language processing may thus support building an unambiguous knowledge base with a unique data set for each communication type and contact identifier.

A range of possible user responses may vary with communication (i.e., event) type. For example, possible user responses to calendar type communication, e.g., meeting request, may be relatively limited. Possible user responses may include "accept" with or without comment and "reject" with or without comment. In another example, possible user responses to a telephone call may include accepting the call, sending the telephone call to voicemail with or without additional response (e.g., outgoing message) and/or rejecting the telephone call but providing a text message response to the telephone call. Possible responses to received emails, text messages and/or social media communications may be relatively less constrained. The possible user responses may typically be related to the content of the received communication. In other words, possible user responses are related to event type, contact name and/or group name and may be related to content. For example, received communications may be classified into a content category based, at least in part, on content. Categories may include, but are not limited to, Declarative, Interrogative, Imperative and Exclamatory. Such classification may facilitate selecting a best response from the possible response(s) included in knowledge base 150, 130.

In some situations, a communication may be received that has a communication source identifier that is not associated with a contact name. In other words, the communication source and/or contact name may be unknown to the user and/or not included in contacts 132, 152. The communication content from the unknown communication source and content of the user response to the communication from the unknown communication source may be captured. Similar to communication content and user response associated with known contact names, event types and possible user responses may be associated in knowledge base 130, 150 with the contact identifier corresponding to unknown. Thus, possible user responses may be collected supporting providing automated user response options to the user even when the communication source is unknown.

In some situations, a data structure may not exist initially for a selected contact name and event type. For example, a corresponding data structure may not exist for a relatively new contact and/or a contact who communicates relatively infrequently with the user. Knowledge base 130, 150 may thus include a default data structure for each event type with a contact identifier of "default". The default data structure(s) may then include relatively generic possible user responses. The default data structures may be predefined and/or the possible user responses may be set by the user.

Thus, knowledge base 130, 150 may include a plurality of data structures. Each data structure may be associated with a respective event type and contact identifier pair. Event types may include telephone calls, emails, text messages, calendar requests and/or social media communications. Contact identifiers may include contact name, group name, unknown and/or default.

Thus, knowledge base 130, 150 may include one or more data structure(s) that may be constructed, e.g., populated, based, at least in part, on history. Each data structure may be related to an event type and contact identifier pair. Each data structure may include a plurality of elements. Each element may correspond to a possible user response and may include an associated ranking, e.g., count. For example, each element may include a possible user response identifier and a count of the number of times the associated possible user response was chosen by the user. The elements may be arranged in the data structure according to the ranking. The ranking corresponds to the count of the number of times that the user provided the associated response. For example, a relatively higher ranked response may correspond to a relatively higher count. Continuing with this example, the highest ranked response corresponds to a first possible response, a next highest ranked response corresponds to a second possible response, etc.

The data structures may each be associated with a contact identifier and an event type. In some embodiments, a data structure may be associated with a contact name and an event type. In some situations, a communication source identifier may be included in contacts 132, 152 but a corresponding data structure may not exist. For example, prior communications may be infrequent or may not exist between companion device 104 and communication partner device 108 for this communication source identifier. In these situations, contact identifier may be set to "default" by, e.g., automatic response logic 124, 144. In some situations, a communication source identifier may not be included in contacts 132, 152. In these situations, the contact identifier may be set to "unknown" by, e.g., automatic response logic 124, 144.

In operation, when a communication is received from communication partner device 108, the event type may be identified, the communication source identified and the contact identifier determined. Utilizing the event type and the contact identifier, a corresponding data structure may be selected. One or more possible user responses may be retrieved from the selected data structure (or locations pointed to by elements of the data structure) and may be provided to the user in rank order. The user may then select (i.e., choose) one of the provided possible user responses or the user may choose to respond manually. The selected data structure may then be updated based, at least in part, on the user's selection.

Figure 2A:
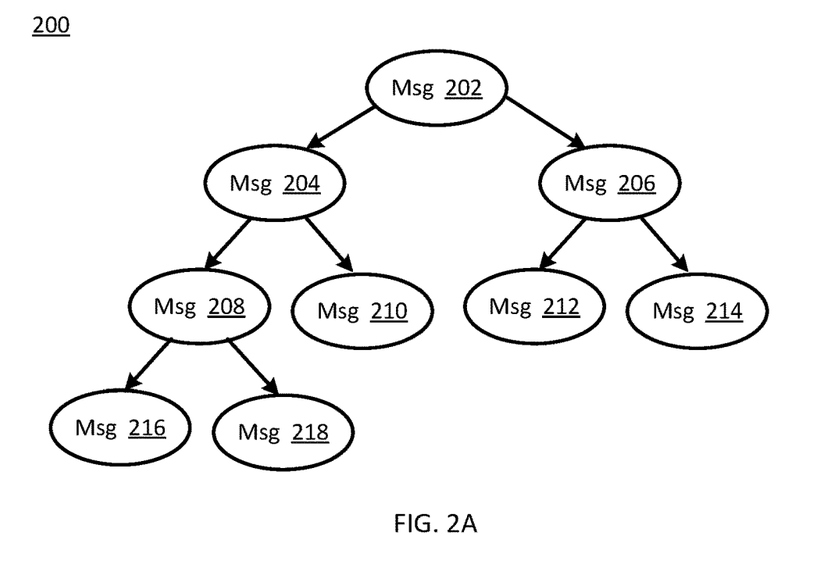
FIGS. 2A and 2B illustrate an example priority queue data structure consistent with one embodiment of the present disclosure.
Figure 2B:
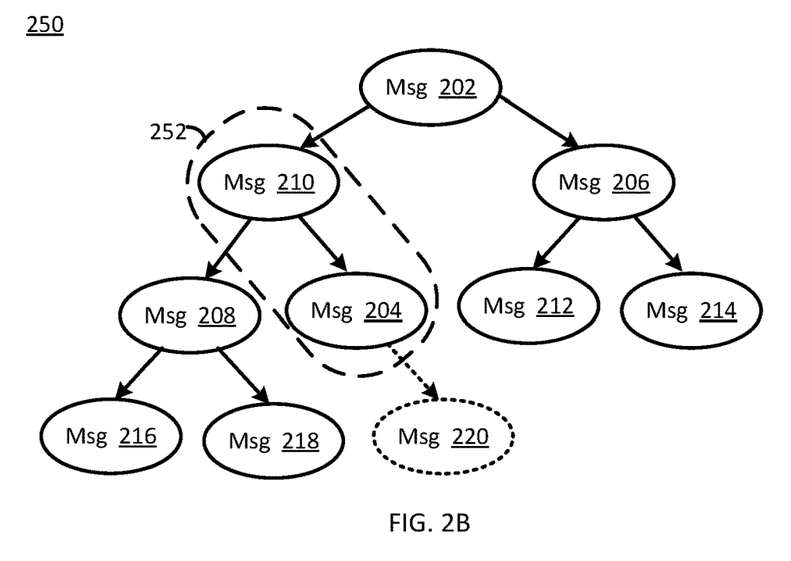

FIGS. 2A and 2B illustrate an example priority queue data structure 200, 250 consistent with one embodiment of the present disclosure. FIGS. 2A and 2B may be best understood when considered together. A priority queue is configured to facilitate searching a ranked list of elements. The priority queue may thus include a plurality of linked elements. Each element corresponds to a possible user response and an associated ranking, e.g., count. Thus, a position in a respective queue may correspond to relative rank. Each element may include a corresponding possible user response or an identifier (e.g., pointer) associated with the corresponding possible user response.

Turning now to FIG. 2A, the example priority queue 200 includes nine possible user responses (Msg) 202, 204, 206, 208, 210, 212, 214, 216 and 218. Possible user response 202 has the highest associated rank and may thus be provided to a user first in a list of possible user responses. Possible user response 218 has the lowest associated rank and may thus be provided to the user last in the list of possible user responses. In this example 200, the priority queue may be populated from the top, e.g., possible user response 202, down and from left to right. Thus, the rank order of the nine possible user responses corresponds to the numeric order of their associated reference designators.

Turning now to FIG. 2B, example priority queue 250 illustrates an update 252 to example priority queue 200 as a result of a user selecting possible user response 210. Continuing with this example, as a result of the user selection the count associated with possible user response 210 has increased to exceed the count associated with user possible response 204. Accordingly, relative positions of possible user responses 204 and 210 are swapped in the priority queue 250.

Example priority queue 250 further illustrates adding a user manual response, e.g., possible user response 220, to the example priority queue 250. In this example 250, since the priority queue 250 is populated top down and left to right, the possible user response 220 is added at the same level as possible user responses 216, 218 and is linked to possible user response 204. In other configurations of a priority queue, elements may be added from right to left, thus, example 250 is one nonlimiting example.

Thus, knowledge base 130, 150 may store a plurality of data structures. Each data structure may be associated with a contact identifier and an event type. The data structures, e.g., priority queues 200, 250, are configured to facilitate maintaining a ranked list of elements (i.e., user possible responses). Knowledge base data structures may be configured to store a plurality of possible user responses ranked based, at least in part, on a history. The history may include a frequency, e.g., a count, corresponding to each time the user selected an associated possible user response in response to receiving a communication (i.e., event) from an associated communication source (e.g., contact name and/or contact group).

Turning again to FIG. 1, operation of the automatic response system may be initiated in response to receiving a communication, i.e., an event. The communication may be received by companion device 104 from, e.g., communication partner device 108. Companion device 104 may then provide the received communication to wearable device 102. The event type may then be determined. For example, automatic response logic 124 and/or 144 may be configured to determine the event type. The communication source may then be identified. Automatic response logic 124 and/or 144 may identify the communication source based, at least in part, on the received communication and associated communication source identifier. For example, communication source identifiers may include, but are not limited to, telephone numbers, email addresses, texting numbers, social media usernames, social media addresses, etc. Identifying the communication source may include capturing the communication source identifier. The communication source identifiers may or may not be associated with a contact name in contacts 132, 152. One or more contact names may be associated with a group name in contacts 132, 152. A contact identifier may be determined based, at least in part, on the communication source identifier. In some situations, a communication source identifier may be included in contacts 132, 152 but a corresponding data structure may not exist. For example, prior communications may be infrequent or may not exist between companion device 104 and communication partner device 108 for this communication source identifier. In these situations, contact identifier may be set to "default" by, e.g., automatic response logic 124, 144. In some situations, a communication source identifier may not be included in contacts 132, 152. In these situations, the contact identifier may be set to "unknown" by, e.g., automatic response logic 124, 144.

If the user does not respond manually, a data structure may then be selected. For example, the data structure may be selected by automatic response logic 124 and/or 144. The data structure may be selected based, at least in part, on the event type and based, at least in part, on the contact identifier. For example, each data structure in knowledge base 130, 150 may be associated with one event type and contact identifier pair. A granularity associated with the possible user response(s) where the contact name and group name are known may be at the group level and/or at the contact name level. Utilizing the group name may facilitate identifying a plurality of possible user response(s). Utilizing the contact name may facilitate identifying relatively more directed possible user responses.

Possible user responses may be related to event type. For an event type equal to calendar, i.e., a meeting request, possible responses include accept, reject, accept with message and reject with message. The particular possible user response may be related to the group name and the contact name. For example, if the group name is coworkers and contact name corresponds to the user's supervisor then the priority response may be accept. In another example, if the contact identifier is unknown then the priority response may be reject.

One or more of the possible user response(s) included in the selected data structure may be provided to the user in an order that corresponds to the ranking of each possible user response. In other words, relatively higher ranked possible user response(s) may be provided before relatively lesser ranked possible responses are provided. For example, if the UI 126 includes a display, the ranked possible user response(s) may be displayed on the display 126. In another example, if the UI 126 includes a speaker, audio corresponding to the ranked possible user response(s) may be provided. All or fewer than all of the possible user response(s) may be provided to the user. The number of possible user response(s) provided may be selected by the user.

The user may select a provided possible user response or the user may provide a manual response. For example, the user may select the first provided possible user response in a list of ranked possible user responses by tapping the wearable device 102. In another example, if the first provided possible user response does not correspond to the user's choice, the user may scroll (e.g., by a swiping gesture) until a desired possible user response is displayed. The user may then tap (e.g., double tap) on the wearable device 102 to indicate selection of the desired possible user response. A user tap (or taps) relative to a provided possible user response may be interpreted by automatic response logic 124 as an acknowledgment by the user of the selection of the provided possible user response. The selected provided possible user response may then be transmitted by companion device 104 to communication partner device 108.

If the user chooses to provide a manual response, communication content of the manual response may then be captured, as described herein. The knowledge base 130,150 may then be updated to account for the user's choice, i.e., whether the user selected a displayed response or chose to respond manually. If the user selected a provided possible user response, the count associated with that selected provided possible user response may be incremented. If, on the other hand, the user chose to respond manually, a respective count associated with at least the first provided possible user response may be decremented. The manual response and/or information related to the manual response may then be added to the knowledge base 130,150 with a count of one.

In some situations, the data structure size may be limited to a maximum number of elements (i.e., possible user responses and associated counts). If adding a new manual response would increase the data structure size to exceed the maximum number of elements, an existing response associated with the lowest count in the data structure may be discarded and replaced by the new manual response. If adding the new manual response would not increase the data structure size to exceed the maximum number of elements, the new manual response and its associated count may be added.

Thus, the knowledge base 130, 150, may be utilized to identify one or more possible user response(s) associated with a received communication. For example, the event type and contact identifier may be determined, a knowledge base data structure identified and possible user response(s) retrieved. The user may then select a provided possible user response or may choose to reply manually. The knowledge base 130, 150 may then be updated based, at least in part, on the user choice.

Figure 3:
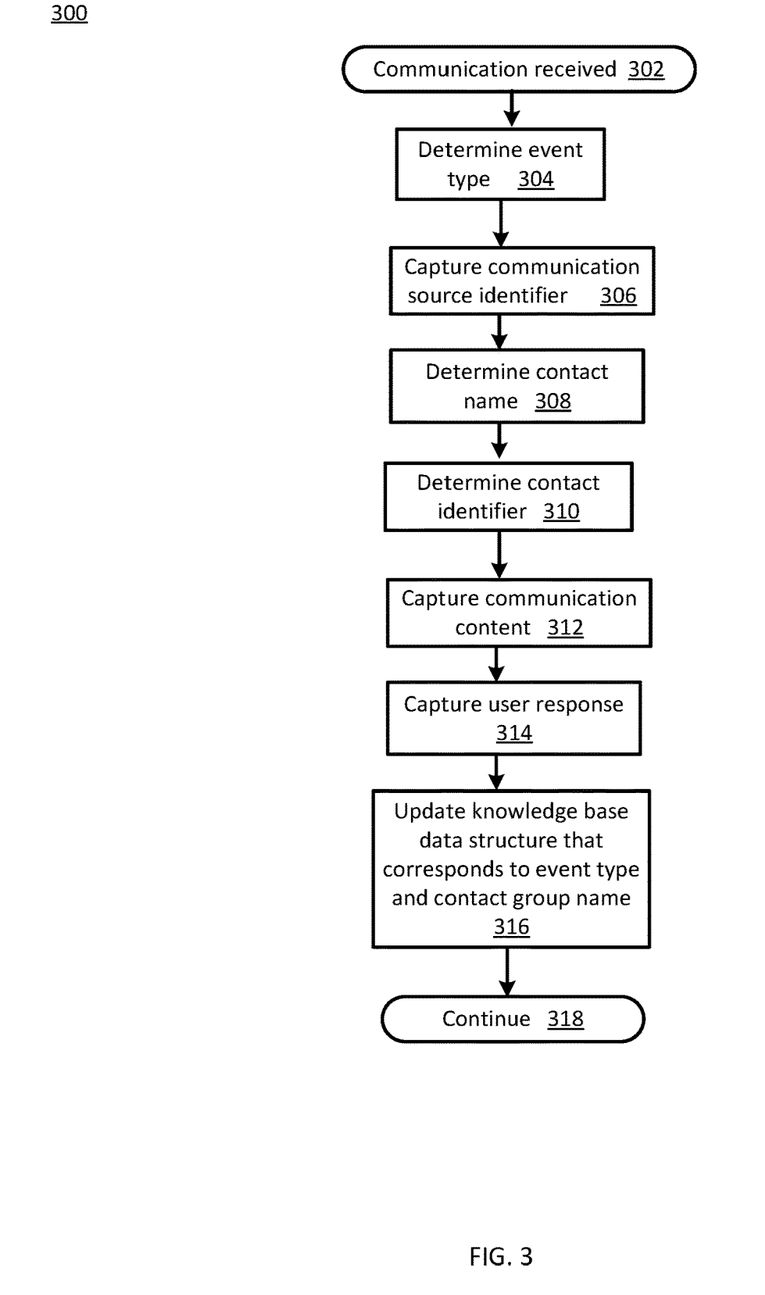
FIG. 3 is a flowchart of initial knowledge base operations according to various embodiments of the present disclosure.

FIG. 3 is a flowchart 300 of initial knowledge base operations according to various embodiments of the present disclosure. In particular, the flowchart 300 illustrates constructing, i.e., populating, the initial knowledge base data structure(s). The operations may be performed, for example, by automatic response logic 124, 144 of FIG. 1.

Operations of this embodiment may begin with receiving a communication 302. For example, a communication may be received from communication partner device 108 by wearable device 102 via companion device 104. Communications may include, but are not limited to, a telephone call, email, a text message, a calendar request and/or a social media communication. An event type may be determined at operation 304. Event type corresponds to communication type. A communication source identifier may be captured at operation 306. A contact name may be determined at operation 308. For example, the contact name may be determined utilizing the communication source identifier captured at operation 306 and contacts 132, 152. A contact identifier may be determined at operation 310. The contact identifier may correspond to the contact name or may be unknown, e.g., if the communication source identifier is not included in a contacts list, e.g., contacts 132, 152. The communication and/or communication content may be captured at operation 312. A user response may be captured at 314. A knowledge base data structure that corresponds to the event type and the contact identifier may be updated at operation 316. For example, the knowledge base data structure may correspond to a priority queue. Program flow may continue at operation 318.

Thus, a knowledge base, i.e., one or more data structure(s), may be constructed based, at least in part, on received communications and based, at least in part, on user responses to the received communications. The knowledge base may then be utilized during operation to provide possible user responses to the user in response to receiving a communication.

Figure 4:
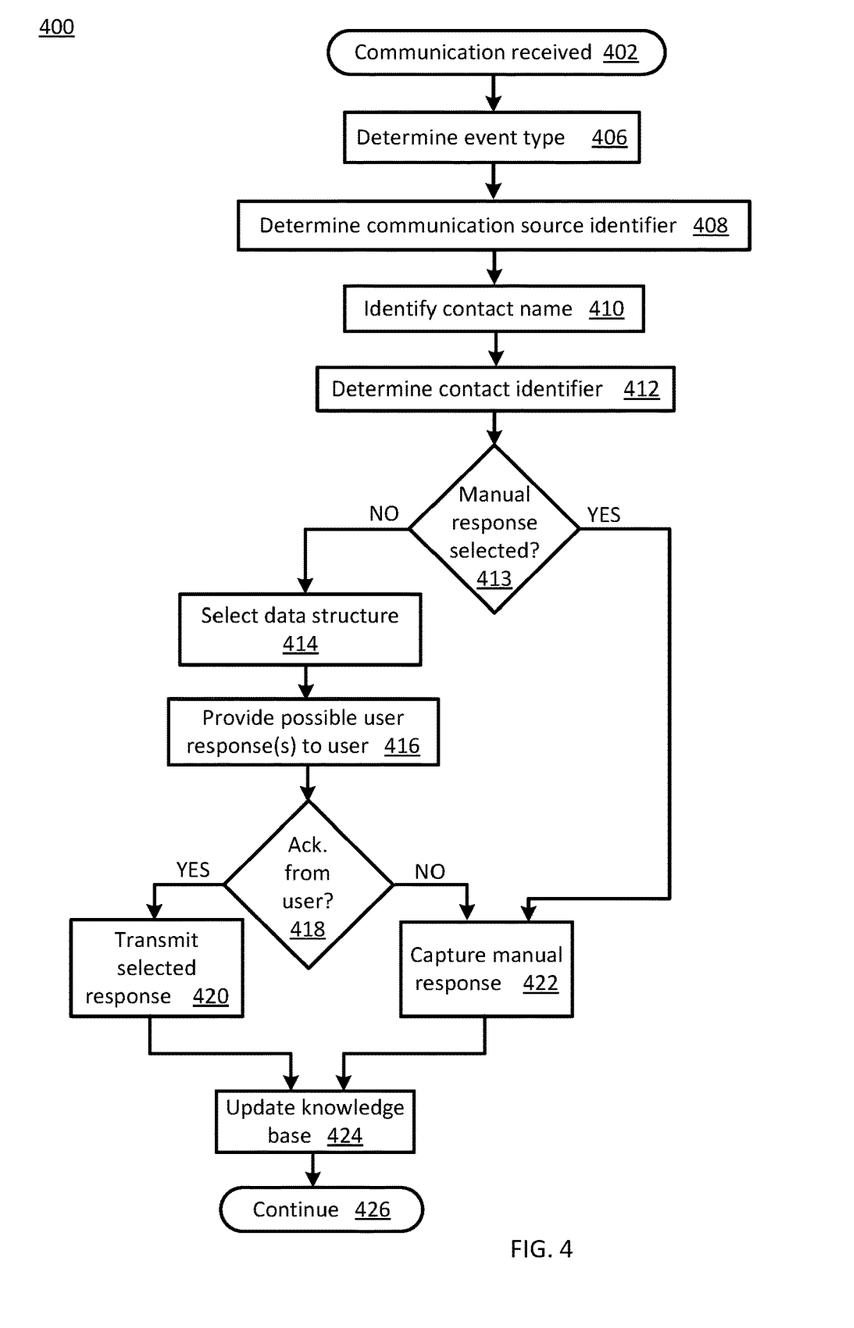
FIG. 4 is a flowchart of automatic response operations according to various embodiments of the present disclosure.

FIG. 4 is a flowchart 400 of automatic response operations according to various embodiments of the present disclosure. In particular, the flowchart 400 illustrates providing one or more possible user response(s) to a user based, at least in part, on an event type and based, at least in part, on a contact identifier. The operations may be performed, for example, by automatic response logic 124 and/or 144 of FIG. 1.

Operations of this embodiment may begin with receiving a communication 402. An event type may be determined at operation 406. A communication source identifier may be determined at operation 408. Operation 410 includes identifying a contact name. Operation 412 includes determining a contact identifier. For example, if the communication source identifier is not related to a contact name, then the contact identifier may be set to unknown. In another example, if a data structure that corresponds to the contact name and event type does not exist, then the contact identifier may be set to default. Otherwise, the contact identifier may be set to the contact name or the group name for the group that includes the contact name. Whether a manual response is selected may be determined at operation 413. For example, an active response by the user to the received communication may correspond to selecting manual response. If manual response is selected, the manual response may be captured at operation 422. The manual response may then be transmitted by, e.g., communication logic 145, independent of operation of automatic response logic 124, 144. A knowledge base data structure may then be updated at operation 424. For example, the manual response contact may be added to the data structure corresponding to the determined event type and the determined contact identifier. Program flow may then continue at operation 426. If manual response is not selected, a data structure may be selected at operation 414. For example, the data structure corresponding to the event type and contact identifier may be selected. One or more possible user response(s) may be provided to a user at operation 416. For example, the possible user response(s) may be provided in rank order.

Whether an acknowledgment is received from the user may be determined at operation 418. For example, an acknowledgment may correspond to a user selecting a possible user response from the provided ranked possible user response(s) by, e.g., tapping on the wearable device 102. In another example, a lack of an acknowledgment may correspond to the user responding manually. If an acknowledgment is not received, program flow may then proceed to operation 422 and the user manual response may be captured. If an acknowledgment is received, the selected possible user response may be transmitted at operation 420. For example, the selection may be communicated from wearable device 102 to companion device 104. Companion device 104 may then transmit the selected possible user response to, e.g., communication partner device 108. Program flow may then proceed to operation 424 and the knowledge base may be updated.

Thus, one or more ranked possible user response(s) may be provided to a user in response to receiving a communication at a wearable device. Selection of the possible user response(s) provided to the user may be based, at least in part, on an event type and based, at least in part, on a contact identifier. The user may then select one of the provided ranked possible user response(s) or may respond manually. The knowledge base may then be updated to reflect the user's choice. Thus, entering user response content on a wearable device may sometimes be avoided.

While the flowcharts of FIGS. 3 and 4 illustrate operations according to various embodiments, it is to be understood that not all of the operations depicted in FIGS. 3 and 4 are necessary for other embodiments. In addition, it is fully contemplated herein that in other embodiments of the present disclosure, the operations depicted in FIGS. 3 and/or 4 and/or other operations described herein may be combined in a manner not specifically shown in any of the drawings, and such embodiments may include less or more operations than are illustrated in FIGS. 3 and 4. Thus, claims directed to features and/or operations that are not exactly shown in one drawing are deemed within the scope and content of the present disclosure.

Thus, an apparatus, method and/or system are configured to provide a user with ranked possible user response(s) on a wearable device in response to a communication received by the wearable device via a companion device from a communication partner device. The user may then select one of the ranked possible user response(s) using the wearable device or may choose to respond manually using either the wearable device or the companion device. Providing ranked possible user response(s) is configured to facilitate selection, by the user, of a desired user response while avoiding entering (e.g., typing) the user response content on the wearable device.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The operating system (OS) may be configured to manage system resources and control tasks that are run on, e.g., wearable device 102 and/or companion device 104. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Network 106 may include a packet switched network. Companion device 104, communication partner device 108 and/or network 106 may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, companion device 104, communication partner device 108 and/or network 106 may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, companion device 104, communication partner device 108 and/or network 106 may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, companion device 104, communication partner device 108 and/or network 106 may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Wearable device 102, companion device 104, communication partner device 108 and/or network 106 may comply and/or be compatible with one or more communication specifications, standards and/or protocols. The communications protocols may include but are not limited to wired communications protocols and/or wireless communications protocols.

For example, wearable device 102 and/or companion device 104 may comply and/or be compatible with Bluetooth® Core Specification, version 4.2, published by Bluetooth® SIG (Special Interest Group), Kirkland, Wash., December 2014, and/or later and/or related versions of this standard, e.g., Bluetooth® Low Energy (BLE), Bluetooth® Smart and/or Bluetooth® Core Specification, version 4.0, published June 2010.

In another example, wearable device 102 and/or companion device 104 may comply or be compatible with one or more NFC and/or RFID standards published by the International Standards Organization (ISO) and/or the International Electrotechnical Commission (IEC), including ISO/IEC 14443, titled: Identification cards—Contactless integrated circuit cards—Proximity cards, published in 2008; ISO/IEC 15693: Identification cards—Contactless integrated circuit cards—Vicinity cards, published in 2006, titled: ISO/IEC 18000, titled: Information technology—Radio frequency identification for item management, published in 2008; and/or ISO/IEC 18092, titled: Information technology—Telecommunications and information exchange between systems—Near Field Communication—Interface and Protocol, published in 2004; and/or later versions of these standards.

In another example, wearable device 102 and/or companion device 104 may comply and/or be compatible with IEEE (Institute of Electrical and Electronics Engineers) 802.15.4-2006 standard titled: IEEE Standard for Information technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, wearable device 102 and/or companion device 104 may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, wearable device 102 and/or companion device 104 may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

In another example, companion device 104, communication partner device 108 and/or network 106 may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 4: Enhancements for Very High Throughput for Operation in Bands below 6 GHz, published by the IEEE, December 2013.

Companion device 104, communication partner device 108 and/or network 106 may comply and/or be compatible with one or more third generation (3G) telecommunication standards, recommendations and/or protocols that may comply and/or be compatible with International Telecommunication Union (ITU) Improved Mobile Telephone Communications (IMT)-2000 family of standards released beginning in 1992, and/or later and/or related releases of these standards. For example, companion device 104, communication partner device 108 and/or network 106 may comply and/or be compatible with one or more CDMA (Code Division Multiple Access) 2000 standard(s) and/or later and/or related versions of these standards including, for example, CDMA2000 1×RTT, 1× Advanced and/or CDMA2000 1×EV-DO (Evolution-Data Optimized): Release 0, Revision A, Revision B, Ultra Mobile Broadband (UMB). In another example, companion device 104, communication partner device 108 and/or network 106 may comply and/or be compatible with UMTS (Universal Mobile Telecommunication System) standard and/or later and/or related versions of these standards.

Companion device 104, communication partner device 108 and/or network 106 may comply and/or be compatible with one or more fourth generation (4G) telecommunication standards, recommendations and/or protocols that may comply and/or be compatible with ITU IMT-Advanced family of standards released beginning in March 2008, and/or later and/or related releases of these standards. For example, companion device 104, communication partner device 108 and/or network 106 may comply and/or be compatible with IEEE standard: IEEE Std 802.16™-2012, title: IEEE Standard for Air Interface for Broadband Wireless Access Systems, released August 2012, and/or related and/or later versions of this standard. In another example, companion device 104, communication partner device 108 and/or network 106 may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

Memory 122, 142 may each include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, an automatic response system for wearables has been described. An apparatus, method and/or system are configured to provide a user with ranked possible user response(s) on a wearable device in response to a communication received by the wearable device via a companion device from a communication partner device. The user may then select one of the ranked possible user response(s) using the wearable device or may choose to respond manually using either the wearable device or the companion device. Providing ranked possible user response(s) is configured to facilitate selection, by the user, of a desired user response while avoiding entering (e.g., typing) the user response content on the wearable device.

EXAMPLES

Examples of the present disclosure include subject material such as a method, means for performing acts of the method, a device, or of an apparatus or system related to an automatic response system for wearables, as discussed below.

Example 1

According to this example, there is provided an apparatus. The apparatus includes a wearable device. The wearable device includes a knowledge base including at least one data structure, each data structure including a plurality of ranked possible user responses; a user interface; and automatic response logic. The automatic response logic is to select one data structure of the at least one data structure in response to a received communication, the selecting based, at least in part, on an event type and based, at least in part, on a contact identifier, the communication received from a communication partner device via a companion device; the automatic response logic further to provide at least one ranked possible user response from the selected data structure to a user via the user interface.

Example 2

This example includes the elements of example 1, wherein the automatic response logic is further to update the knowledge base based, at least in part, on a user selection.

Example 3

This example includes the elements of example 1, wherein the automatic response logic is further to determine the event type and to determine a communication source identifier based, at least in part, on the received communication.

Example 4

This example includes the elements of example 3, wherein the automatic response logic is further to determine the contact identifier based, at least in part, on the communication source identifier.

Example 5

This example includes the elements according to any one of examples 1 to 3, wherein the event type is a telephone call, an email, a text message, a calendar message or a social media communication.

Example 6

This example includes the elements according to any one of examples 1 to 3, wherein the contact identifier is a contact name, a group name, unknown or default.

Example 7

This example includes the elements according to any one of examples 1 to 3, wherein the wearable device is selected from the group including a wearable computer, a "smart" watch, a smart bracelet, a smart wristband, smart glasses, smart clothing, an activity tracker and a fitness tracker.

Example 8

This example includes the elements of example 3, wherein the communication source identifier is selected from the group including a telephone number, an email address, a texting number, a social media username and a social media address.

Example 9

This example includes the elements according to any one of examples 1 to 3, wherein each data structure corresponds to a priority queue.

Example 10

This example includes the elements according to any one of examples 1 to 3, wherein the automatic response logic is further to capture a user manual response.

Example 11

According to this example, there is provided an apparatus. The apparatus includes a companion device. The companion device includes a knowledge base and automatic response logic. The knowledge base includes at least one data structure, each data structure including a plurality of ranked possible user responses. The automatic response logic is to select one data structure of the at least one data structure in response to a received communication, the selecting based, at least in part, on an event type and based, at least in part, on a contact identifier, the communication received from a communication partner device; the automatic response logic further to provide at least one ranked possible user response from the selected data structure to a wearable device.

Example 12

This example includes the elements of example 11, wherein the automatic response logic is further to update the knowledge base based, at least in part, on a user selection.

Example 13

This example includes the elements of example 11, wherein the automatic response logic is further to determine the event type and to determine a communication source identifier based, at least in part, on the received communication.

Example 14

This example includes the elements of example 13, wherein the automatic response logic is further to determine the contact identifier based, at least in part, on the communication source identifier.

Example 15

This example includes the elements according to any one of examples 11 to 13, wherein the event type is a telephone call, an email, a text message, a calendar message or a social media communication.

Example 16

This example includes the elements according to any one of examples 11 to 13, wherein the contact identifier is a contact name, a group name, unknown or default.

Example 17

This example includes the elements according to any one of examples 11 to 13, wherein the companion device is selected from the group including a mobile telephone, a smart phone, a computing system, an ultraportable computer, an ultramobile computer, a netbook computer and a subnotebook computer.

Example 18

This example includes the elements of example 13, wherein the communication source identifier is selected from the group including a telephone number, an email address, a texting number, a social media username and a social media address.

Example 19

This example includes the elements according to any one of examples 11 to 13, wherein each data structure corresponds to a priority queue.

Example 20

This example includes the elements according to any one of examples 11 to 13, wherein the automatic response logic is further to capture a user manual response.

Example 21

According to this example, there is provided a method. The method includes selecting, by automatic response logic, one data structure from a knowledge base in response to a received communication based, at least in part, on an event type and based, at least in part, on a contact identifier, the communication received from a communication partner device, the knowledge base including at least one data structure, each data structure including a plurality of ranked possible user responses. The method further includes providing, by the automatic response logic, at least one ranked possible user response from the selected data structure to a user via a wearable device user interface.

Example 22

This example includes the elements of example 21, further including updating, by the automatic response logic, the knowledge base based, at least in part, on a user selection.

Example 23

This example includes the elements of example 21, further including determining, by the automatic response logic, the event type and a communication source identifier based, at least in part, on the received communication.

Example 24

This example includes the elements of example 23, further including determining, by the automatic response logic, the contact identifier based, at least in part, on the communication source identifier.

Example 25

This example includes the elements of example 21, wherein the event type is a telephone call, an email, a text message, a calendar message or a social media communication.

Example 26

This example includes the elements of example 21, wherein the contact identifier is a contact name, a group name, unknown or default.

Example 27

This example includes the elements of example 23, wherein the communication source identifier is selected from the group including a telephone number, an email address, a texting number, a social media username and a social media address.

Example 28

This example includes the elements of example 21, wherein each data structure is a priority queue.

Example 29

This example includes the elements of example 21, further including capturing, by the automatic response logic, a manual response.

Example 30

This example includes the elements of example 26, wherein unknown corresponds to a communication source identifier that is not included in a contact list.

Example 31

According to this example, there is provided a computer readable storage device having stored thereon instructions that when executed by one or more processors result in the following operations including selecting one data structure from a knowledge base in response to a received communication based, at least in part, on an event type and based, at least in part, on a contact identifier, the communication received from a communication partner device, the knowledge base including at least one data structure, each data structure including a plurality of ranked possible user responses; and providing at least one ranked possible user response from the selected data structure to a user via a wearable device user interface.

Example 32

This example includes the elements of example 31, wherein the instructions that when executed by one or more processors results in the following additional operations including updating the knowledge base based, at least in part, on a user selection.

Example 33

This example includes the elements of example 31, wherein the instructions that when executed by one or more processors results in the following additional operations including determining the event type and a communication source identifier based, at least in part, on the received communication.

Example 34

This example includes the elements of example 33, wherein the instructions that when executed by one or more processors results in the following additional operations including determining the contact identifier based, at least in part, on the communication source identifier.

Example 35

This example includes the elements according to any one of examples 31 to 33, wherein the event type is a telephone call, an email, a text message, a calendar message or a social media communication.

Example 36

This example includes the elements according to any one of examples 31 to 33, wherein the contact identifier is a contact name, a group name, unknown or default.

Example 37

This example includes the elements of example 33, wherein the communication source identifier is selected from the group including a telephone number, an email address, a texting number, a social media username and a social media address.

Example 38

This example includes the elements according to any one of examples 31 to 33, wherein each data structure is a priority queue.

Example 39

This example includes the elements according to any one of examples 31 to 33, wherein the instructions that when executed by one or more processors results in the following additional operations including capturing a manual response.

Example 40

This example includes the elements of example 36, wherein unknown corresponds to a communication source identifier that is not included in a contact list.

Example 41

According to this example, there is provided a device. The device includes means for selecting, by automatic response logic, one data structure from a knowledge base in response to a received communication based, at least in part, on an event type and based, at least in part, on a contact identifier, the communication received from a communication partner device, the knowledge base including at least one data structure, each data structure including a plurality of ranked possible user responses. The method further includes means for providing, by the automatic response logic, at least one ranked possible user response from the selected data structure to a user via a wearable device user interface.

Example 42

This example includes the elements of example 41, further including means for updating, by the automatic response logic, the knowledge base based, at least in part, on a user selection.

Example 43

This example includes the elements of example 41, further including means for determining, by the automatic response logic, the event type and a communication source identifier based, at least in part, on the received communication.

Example 44

This example includes the elements according to any one of examples 41 to 43, further including means for determining, by the automatic response logic, the contact identifier based, at least in part, on the communication source identifier.

Example 45

This example includes the elements according to any one of examples 41 to 43, wherein the event type is a telephone call, an email, a text message, a calendar message or a social media communication.

Example 46

This example includes the elements according to any one of examples 41 to 43, wherein the contact identifier is a contact name, a group name, unknown or default.

Example 47

This example includes the elements of example 43, wherein the communication source identifier is selected from the group including a telephone number, an email address, a texting number, a social media username and a social media address.

Example 48

This example includes the elements according to any one of examples 41 to 43, wherein each data structure is a priority queue.

Example 49

This example includes the elements according to any one of examples 41 to 43, further including means for capturing, by the automatic response logic, a manual response.

Example 50

This example includes the elements of example 46, wherein unknown corresponds to a communication source identifier that is not included in a contact list.

Example 51

A system including at least one device arranged to perform the method of any one of claims 21 to 30.

Example 52

A device including means to perform the method of any one of claims 21 to 30.

Example 53

A computer readable storage device having stored thereon instructions that when executed by one or more processors result in the following operations including: the method according to any one of claims 21 through 30.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
a wearable device comprising:
memory circuitry storing electronic data representing a knowledge base that comprises at least one data structure, each data structure comprising a plurality of ranked possible user responses;
user interface circuitry; and
automated response circuitry to:
select one data structure of the at least one data structure in response to one or more first electronic signals representing a communication received via a companion device communicatively coupled to the wearable device, wherein to select the one data structure is based at least in part on one or more of an event type associated with the received communication and a contact identifier associated with the received communication; and
provide, to a user via the user interface circuitry, one or more ranked possible user responses from the selected one data structure.

2. The apparatus of claim 1, wherein the automated response circuitry is further to update the knowledge base based at least in part on a user selection of one of the provided one or more ranked possible user responses.

3. The apparatus of claim 1, wherein the automated response circuitry is further to determine the event type and to determine a communication source identifier based at least in part on the received communication.

4. The apparatus of claim 3, wherein the automated response circuitry is further to determine the contact identifier based at least in part on the communication source identifier.

5. The apparatus of claim 1, wherein the event type associated with the received communication is one or more of a telephone call, an email, a text message, a calendar message or a social media communication and/or the contact identifier associated with the received communication is a contact name, a group name, unknown or default.

6. An apparatus comprising:
a companion device comprising:
memory circuitry storing electronic data representing a knowledge base that comprises at least one data structure, each data structure comprising a plurality of ranked possible user responses; and
automated response circuitry to:
select one data structure of the at least one data structure in response to a communication received from a communication partner device, wherein to select the one data structure is based at least in part on one or more of an event type associated with the received communication and a contact identifier associated with the received communication; and
provide, to a user via user interface circuitry of a wearable device communicatively coupled to the companion device, one or more ranked possible user responses from the selected one data structure.

7. The apparatus of claim 6, wherein the automated response circuitry is further to update the knowledge base based at least in part on a user selection.

8. The apparatus of claim 6, wherein the automated response circuitry is further to determine the event type and to determine a communication source identifier based at least in part on the received communication.

9. The apparatus of claim 8, wherein the automated response circuitry is further to determine the contact identifier based at least in part on the communication source identifier.

10. The apparatus of claim 6, wherein at least one of the event type is a telephone call, an email, a text message, a calendar message or a social media communication and/or the contact identifier is a contact name, a group name, unknown or default.

11. A method comprising:
selecting, via automated response circuitry and in response to a received communication, one data structure from a knowledge base stored via memory circuitry of a wearable device, the selecting of the one data structure being based at least in part on an event type associated with the received communication and a contact identifier associated with the received communication, the communication received from a communication partner device communicatively coupled to the companion device, the knowledge base comprising at least one data structure that each comprises a plurality of ranked possible user responses; and providing, via the automated response circuitry, at least one ranked possible user response from the selected data structure to a user via user interface circuitry of a the wearable device.

12. The method of claim 11, further comprising updating, via the automated response circuitry, the knowledge base based at least in part on a user selection.

13. The method of claim 11, further comprising determining, via the automated response circuitry, the event type and a communication source identifier based at least in part on the received communication.

14. The method of claim 13, further comprising determining, via the automated response circuitry, the contact identifier based at least in part on the communication source identifier.

15. The method of claim 11, wherein at least one of the event type is a telephone call, an email, a text message, a calendar message or a social media communication and/or the contact identifier is a contact name, a group name, unknown or default.

16. A computer readable storage device having stored thereon instructions that when executed by one or more processors result in the following operations comprising:

selecting, via memory circuitry of the storage device that includes electronic data representing a stored knowledge base, one data structure of multiple data structures from the stored knowledge base in response to a communication received from a communication partner device, the selecting of the one data structure being based at least in part on an event type associated with the received communication and a contact identifier associated with the received communication, each of the multiple data structures including a plurality of ranked possible user responses; and providing, via user interface circuitry of a wearable device associated with a user, at least one ranked possible user response from the selected one data structure to the user.

17. The device of claim 16, wherein the instructions that when executed by one or more processors results in the following additional operations comprising updating the knowledge base based at least in part on a user selection.

18. The device of claim 16, wherein the instructions that when executed by one or more processors results in the following additional operations comprising determining the event type and a communication source identifier based at least in part on the received communication.

19. The device of claim 16, wherein the instructions that when executed by one or more processors results in the following additional operations comprising determining the contact identifier based at least in part on the communication source identifier.

20. The device of claim 16, wherein the event type associated with the received communication is a telephone call, an email, a text message, a calendar message or a social media communication, and/or the contact identifier associated with the received communication is a contact name, a group name, unknown or default.

* * * * *